July 28, 1925.
P. DEHNE
1,547,368
FILTERING APPARATUS
Filed March 14, 1923    3 Sheets-Sheet 3
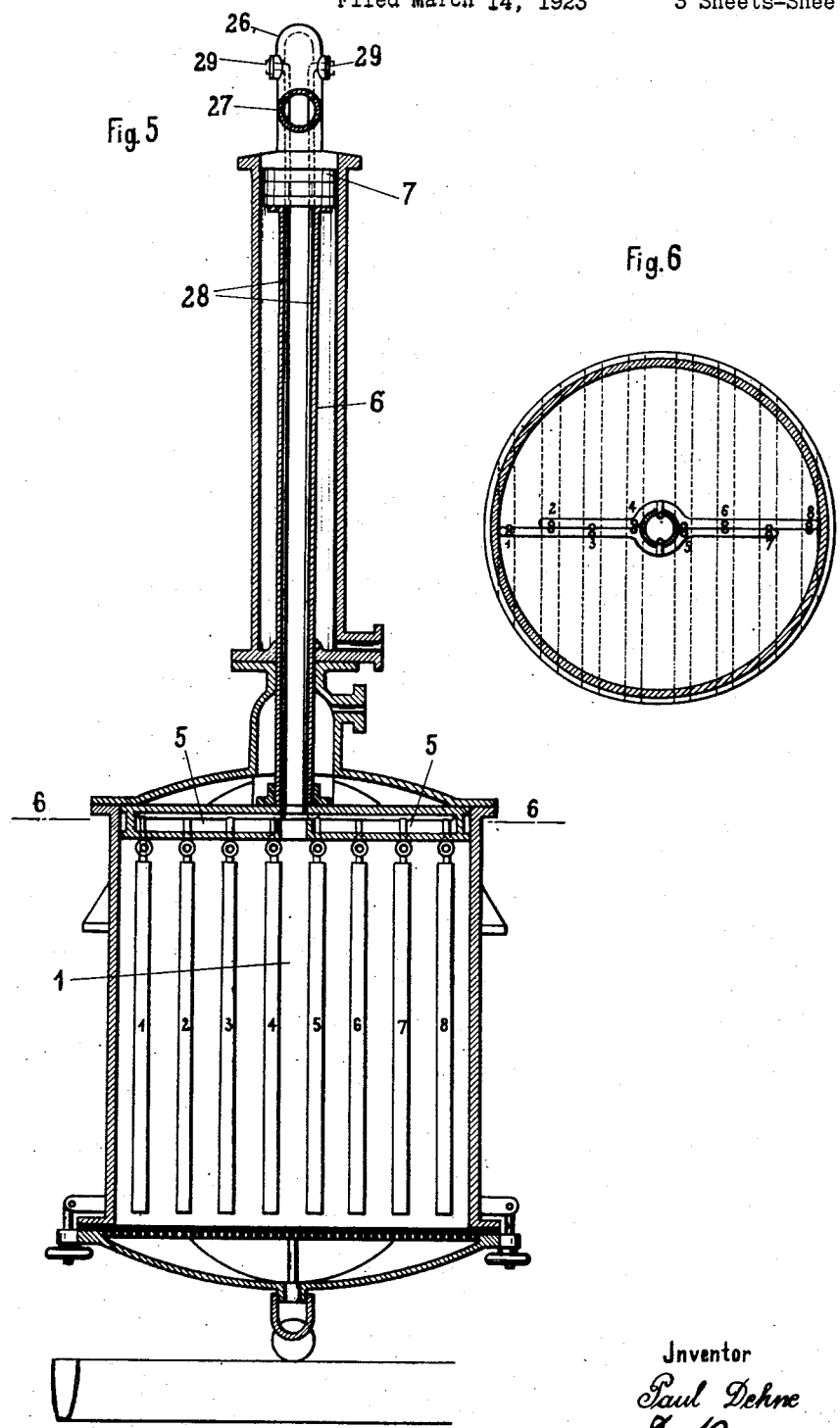
Inventor
Paul Dehne
by
Atty.

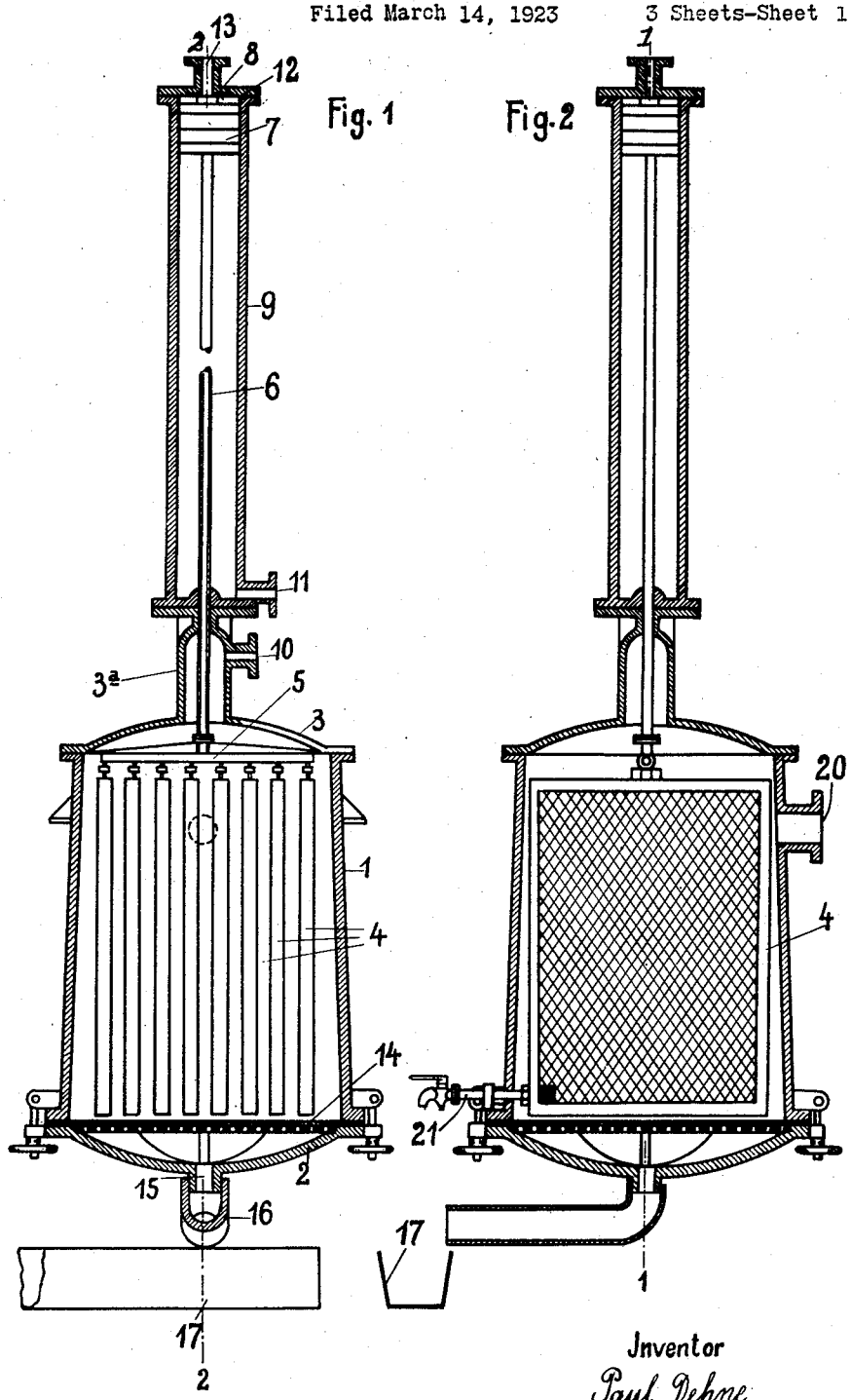

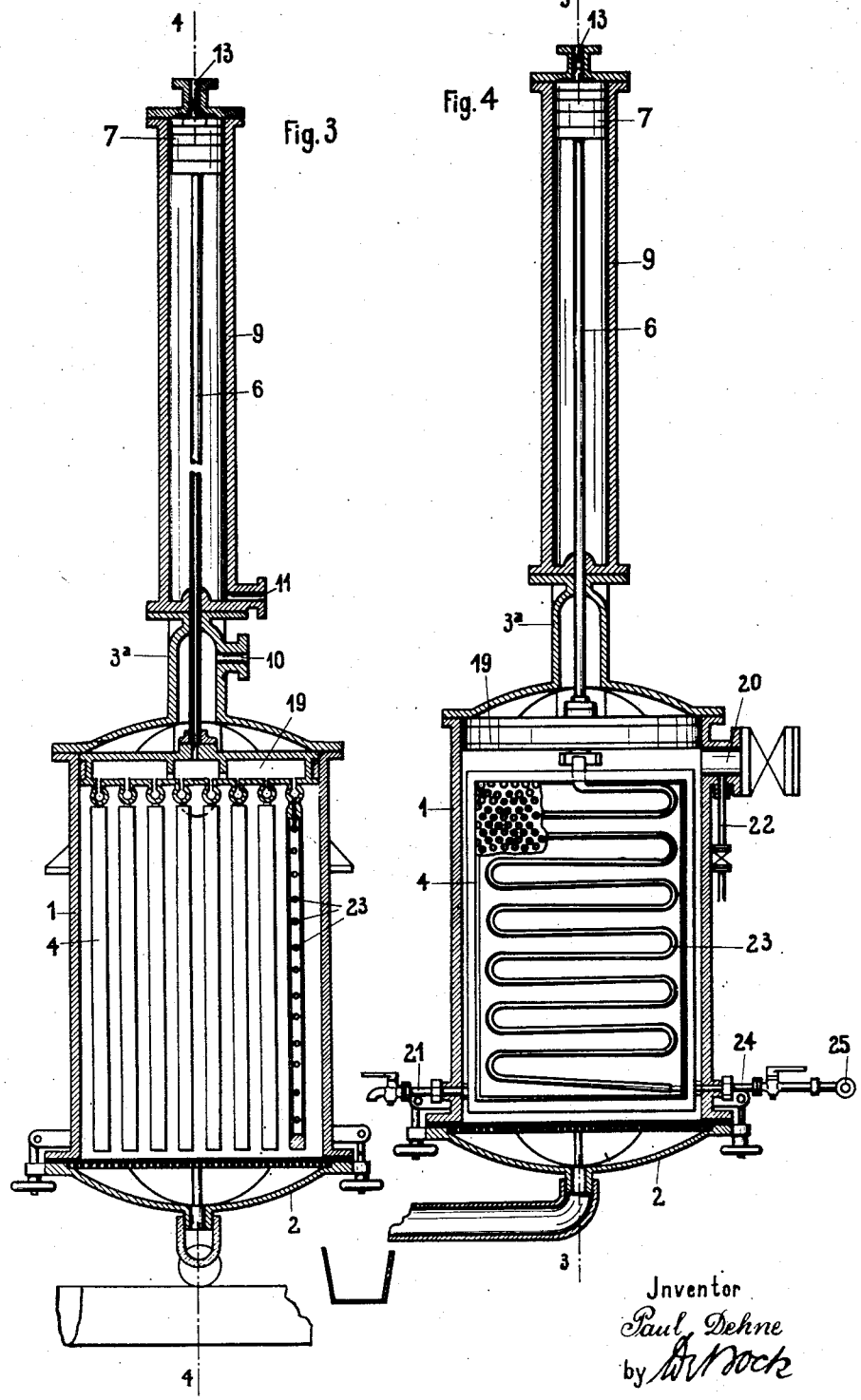

Patented July 28, 1925.

1,547,368

UNITED STATES PATENT OFFICE.

PAUL DEHNE, OF FREIBURG, GERMANY.

FILTERING APPARATUS.

Application filed March 14, 1923. Serial No. 625,164.

*To all whom it may concern:*

Be it known that I, PAUL DEHNE, a citizen of Germany, residing at Freiburg, State of Baden, Germany, have invented certain new and useful Improvements in Filtering Apparatus (for which I have filed applications in Germany March 17, 1922, April 25, 1922, November 17, 1922, January 11 and 27, 1923), of which the following is a specification.

My invention relates to improvements in filtering apparatus, and more particularly in apparatus of the type in which the filter elements are suspended within a closed casing and provided with means for removing the same for cleaning through the bottom of the casing which is normally closed by a lid. It is advantageous to remove the filtering elements through the bottom instead of passing the same through the end or top as is done in apparatus now in use, because when removed through the bottom the filtering elements are more readily accessible for cleaning the same, and, further, the casing can be more readily cleaned through the open bottom, as compared to apparatus in which the said casing must be cleaned through the open top or side walls. Further, my construction is preferable as compared to apparatus now in use in that a hydraulic cylinder is disposed on the top of the casing, and the filtering elements are suspended from a piston rod passed through the top wall of the casing for raising and lowering the filtering elements. It is advantageous to lower the filtering elements out through the bottom instead of passing them out through the end or top as it is known. One of the objects of the improvements is to provide novel means for removing the filter elements. Another object is to provide means for thoroughly cleaning the casing. With these and other objects in view my invention consists in the matters to be described hereinafter and particularly pointed out in the appended claims.

For the purpose of explaining the invention several examples embodying the same have been shown in the accompanying drawings, in which the same reference characters have been used in all the views to indicate corresponding parts. In said drawings, Fig. 1, is a section of the apparatus taken on the line 1—1 of Fig. 2, Fig. 2, is a section taken on the line 2—2 of Fig. 1, Figs. 3 and 4, are sections similar to those shown in Figs. 1 and 2 and showing a modification, Fig. 3 being a section taken on the line 3—3 of Fig. 4 and Fig. 4 being a section taken on the line 4—4 of Fig. 3, Fig. 5, is a section showing another modification, Fig. 6, is a horizontal section taken on the line 6—6 of Fig. 5.

In the example shown in Figs. 1 and 2 the apparatus consists of a conical or cylindrical casing 1 closed at its bottom by a head 2 hinged or otherwise removably secured thereto. Within the casing there are hollow filter elements 4 connected to and suspended from a device for distributing fresh water to washing the elements, such as a water supply pipe 5. As shown the elements are combined into a group adapted to be removed as a whole from the casing after opening the head 2, so that the elements can readily be cleaned.

For removing the elements from the casing the following construction is provided. The fresh water supply pipe 5 connected with a rod 6 guided in the top part of an air chamber 3ª provided on the upper head 3 of the casing, and the said rod carries a piston 7 at its top which is guided in a hydraulic pressure cylinder 9 provided on the top of the air chamber 3ª. At the bottom part of the said cylinder there is an inlet 11 for the admission of water under pressure to the cylinder 9 for holding the piston 7 and the filter elements 4 carried thereby in elevated positions. To the member 11 a two way cock or the like is connected by means of which water is admitted to or withdrawn from the cylinder, and when withdrawing the water the filter elements are lowered and removed from the casing 1.

The piston rod 6 is made hollow for supplying fresh water through the distributing device 5 to the filter elements for washing the residue of the filtration, and the upper cylinder head is formed with a stop 8 for arresting the piston 7 in its uppermost position. The upper cylinder head 12 carries an inlet 13 communicating with a passage made in the piston and with the tubular piston rod 6 for supplying washing water thereto.

Preferably the elements 4 are rockingly suspended from the pipe 5, so that the individual elements may be swung apart for cleaning the same.

The air chamber 3ª is provided with an air inlet 10 for admitting air under pressure to the casing 1 for cleaning the same.

Near the top part of the casing 1 and at the side thereof there is an inlet 20 for the liquid to be filtered. The filtered liquid passes through the filtering fabric and into the filter elements, from which it is withdrawn through pipes 21 including cocks and discharging into a gutter 17. The pipes 21 are removably secured to the filter elements. The head 2 is made concave and the concave part thereof is covered by a sieve 14 having filtering fabric or other material placed thereon. From the chamber thus provided the filtered liquid is discharged through a discharge 15 and a pipe 16 into the gutter 17.

Before starting filtration the cock valves of the pipe 21 are opened, and the matter to be filtered is supplied to the casing 1 through the inlet 20. The liquid passes through the filtering fabric and into the individual filter elements 4 from which it is discharged through the pipes 21 and into the gutter 17. A part of the liquid passes through the bottom sieve 14 and the filtering fabric placed thereon, and it flows through the discharge 15 and the pipe 16 into the gutter 17.

For washing the residue of the filtration remained in the fabric of the elements after closing the pipes 21 fresh water or another suitable liquid is admitted through the inlet 13, the hollow piston rod 6 and the pipe 5 distributing the water into the filter elements 4, which water passes through the filtering fabric and the said residue, whereupon it is discharged through the sieve 14 and the outlet 15 into the gutter 17.

For removing the residue of the filtration not removed by the washing the pipes 21 and the head 2 are removed, after turning the discharge pipe 16 to the side. Thereafter the two-way cock or the like connected with the inlet 11 is set in position for permitting the discharge of the pressure water from the cylinder, and compressed air is admitted through the inlet 10. Thereby the filter elements with the contents of the casing 1 move downwardly until the piston 7 bears on the bottom of the cylinder. In this position of the filter elements the residue which might still adhere to the said elements can easily be removed by swinging the elements apart. For starting another filtration water under pressure is admitted into the cylinder 9 through the inlet 11, which water forces the piston 7 and the filter elements carried thereby upwards, until the piston engages the stop 8 provided on the upper cylinder head 12. The water remaining within the cylinder holds the piston and the filter elements in elevated position. Now the bottom head 2 is moved in closing position, and the pipes 21 are again secured to the filter elements, whereupon filtration can be carried out in the manner described.

In the modification shown in Figs. 3 and 4 provision is made for thoroughly emptying and cleaning the wall of the casing 1. The general construction of the apparatus is similar to that described with reference to Figs. 1 and 2, and the same reference characters have been applied to corresponding parts, so that the construction will be understood without repeating the description. As shown, within the casing 1 and above the filter elements 4 a piston or follower 19 is provided the cross-section of which corresponds to that of the casing, and which is connected with the piston rod 6 carrying the filter elements. In the construction shown in the Figure 3 the piston or follower 19 is hollow and serves as a distributing device in place of the pipe 5 of the Figures 1 and 2. The filter elements are directly suspended from the piston and in communication with its hollow; but I do not limit myself to this feature, and in some cases I suspend the filter elements from a water distributing pipe provided below the piston. If after opening the bottom 2 of the receptacle 1 the filter elements 4 are lowered for cleaning, the piston 19 likewise moves downwardly whereby the casing is thoroughly emptied and its wall is cleaned. The stroke of the piston 7 is such that with the piston 7 in its lowermost position the piston 19 projects somewhat out of the casing 1.

Preferably the inlet 20 (Fig. 4) for the admission of the liquid to be filtered is provided with a branch pipe 22 including a valve or cock. If now the inlet 20 is closed, and the piston 19 moving downwardly passes beyond the inlet 20, by the compressed air admitted through inlet 10 forcing in this case the piston 19 and the filter elements 4 downwardly any liquid which might be left within the casing 1 above the piston 19 is expelled through the pipe 22, whereupon the said pipe is closed.

Also in the modification shown in Figs. 3 and 4 a tubular piston rod 6 is provided, and the cylinder 9 is equipped at its top with an inlet 13, for admitting a washing liquid in place of which also, a cooling, or a heating liquid can be admitted to the filter elements, a cooling liquid being desirable for example for filtering raw oil. Where it is desired to supply a cooling medium through the piston rod 6 and the hollow piston 19 the filter elements are equipped with cooling pipes 23 shown in Fig. 4 and in the right element of Fig. 3, which pipes are connected with the hollow piston 19 and with removable outlet pipes 24 passing through the wall of the casing 1 and discharging into a common pipe 25, the construction being similar to that of the pipes 21.

After removing the residue of the filtration such as paraffin, from the filter elements, water under pressure is admitted to the cylinder 9 and through the inlet 11 for elevating the piston 19 and the filter elements 4, whereupon the bottom of the casing is closed and filtration may again be started.

Where it is desired to filter liquids having a high specific gravity the liquid is preferably supplied to the casing 1 from the top rather than from the side thereof. In the modification shown in Figs. 5 and 6 the tubular piston rod 6 is constructed so as to open at its bottom end into the casing 1, and I connect the same with the supply of the liquid to be filtered, in which case the top part of the piston 7 is preferably equipped with a cap 26 providing an air chamber and connected at its side with the supply of the liquid to be filtered. In this case one or more pipes 28 are disposed within the tubular piston rod for admitting a suitable washing liquid therethrough, which pipes are connected at their top ends with lateral inlets 29 passed through the wall of the cap 26, and at their bottom ends with the distributing device (pipe or piston) 5. In the example shown in the Figure 6 one of the said pipes is connected with the filter elements 1, 3, 5, and 7, and the other one with the elements 2, 4, 6, and 8.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. In a filtering apparatus the combination with a casing, having a supplying pipe for the matter to be filtered and a removable bottom, of a hydraulic pressure cylinder and piston on the top of said casing, a number of vertically hanging hollow filter elements suspended from said hydraulic pressure piston by a piston rod, the stroke of the hydraulic pressure piston being sufficient to move the filter elements into and out of said casing when the bottom has been removed, the elements having detachable discharging pipes for the filtered liquid, and the hydraulic pressure cylinder having a supplying and a discharging pipe for the pressure fluid to said cylinder.

2. In a filtering apparatus the combination with a casing having a supplying pipe for the matter to be filtered and a removable bottom, of a hydraulic pressure cylinder and piston on the top of said casing, a number of vertically hanging hollow filter elements suspended from said hydraulic pressure piston by a tubular piston rod communicating with said filter elements by a distributing device and having a supplying pipe for a suitable washing, cooling or heating liquid, the stroke of the hydraulic pressure piston being sufficient to move the filter elements into and out of said casing when the bottom has been removed, the elements having detachable discharging pipes for the filtered liquid, and the hydraulic pressure cylinder having a supplying and a discharging pipe for the pressure fluid to said cylinder.

3. In a filtering apparatus the combination with a casing, having a supplying pipe for the matter to be filtered and a removable bottom, of an air chamber on the top of said casing communicating with the casing and provided with an air inlet, and a hydraulic pressure cylinder and piston on the top of the air chamber, a number of vertically hanging hollow filter elements suspended from said hydraulic pressure piston by a piston rod, the stroke of the hydraulic pressure piston being sufficient to move the filter elements into and out of said casing when the bottom has been removed, the elements having detachable discharging pipes for the filtered liquid, and the hydraulic pressure cylinder having a supplying and a discharging pipe for the pressure fluid to said cylinder.

4. In a filtering apparatus the combination with a casing having a supplying pipe for the matter to be filtered and a removable bottom, of a hydraulic pressure cylinder and piston on the top of said casing, a number of vertically hanging hollow filter elements suspended from said hydraulic pressure piston by a tubular piston rod communicating with said filter elements by a hollow piston placed in the casing, the cross section of which corresponds to that of the casing, the tubular piston rod having a supplying pipe for a suitable washing, cooling or heating liquid, the stroke of the hydraulic pressure piston being sufficient to move the filter elements into and out of said casing when the bottom has been removed, the elements having detachable discharging pipes for the filtered liquid, and the hydraulic pressure cylinder having a supplying and a discharging pipe for the pressure fluid to said cylinder.

In testimony whereof I have affixed my signature in presence of two witnesses.

PAUL DEHNE.

Witnesses:
MAURICE W. ALTAFFER,
BERT A. LAHEMAN.